United States Patent
Craun et al.

(10) Patent No.: US 6,184,281 B1
(45) Date of Patent: Feb. 6, 2001

(54) STRIPPABLE AQUEOUS EMULSION INOMERIC COATING FOR RECYCLABLE PLASTIC CONTAINERS

(75) Inventors: Gary P. Craun, Berea; Derek G. Rance, Strongsville, both of OH (US)

(73) Assignee: The Glidden Company, Cleveland, OH (US)

( * ) Notice: Under 35 U.S.C. 154(b), the term of this patent shall be extended for 0 days.

(21) Appl. No.: 09/336,575

(22) Filed: Jun. 21, 1999

(51) Int. Cl.⁷ ........................................................ C08K 3/00
(52) U.S. Cl. .......................................... 524/413; 524/434
(58) Field of Search ...................................... 524/413, 424

(56) References Cited

U.S. PATENT DOCUMENTS 4,154,618 * 5/1979 Burke ..................................... 106/27
4,244,883 * 1/1981 Hemmerill et al. .............. 260/42.55

* cited by examiner

Primary Examiner—Edward J. Cain
(74) Attorney, Agent, or Firm—Thomas M. Schmitz

(57) ABSTRACT

Strippable aqueous a ionomeric coating composition suitable for coating plastic substrates where the coatings are easily removable by caustic treatment of the plastic during recycling of the plastic. The strippable ionomeric coatings comprise 80% to 99.8% by weight carboxyl functional aqueous addition copolymer (latex) intermixed with zinc or zirconium ammonium complex, where the zinc or zirconium complex interact during curing to provide ionomeric crosslinking with the.

9 Claims, No Drawings

STRIPPABLE AQUEOUS EMULSION INOMERIC COATING FOR RECYCLABLE PLASTIC CONTAINERS

This invention pertains to aqueous emulsion coatings based on an ionomeric polymeric binder suitable for coating plastics, and particularly ionomeric coatings to be applied to plastic containers subject to recycling where the ionomeric coatings are removable from plastic containers during a caustic recycling process.

BACKGROUND OF THE INVENTION

Industrial coatings are surface protective coatings (paint coatings) applied to substrates and typically cured or crosslinked to form continuous films for decorative and protective purposes. A protective coating ordinarily comprises an organic polymeric binder, pigments, and various paint additives, where the polymeric binder acts as a fluid vehicle for the pigments and imparts fluid rheological properties to the liquid paint coating. Upon curing or crosslinking, the polymeric binder hardens and functions as a solid binder for the pigments and provides adhesion of the dried paint film to the substrate. The pigments may be organic or inorganic and functionally contribute to opacity and color in addition to providing durability and hardness. Protective coatings which contain little or no opacifying pigments are described as clear coatings. The manufacture of protective coatings involves the preparation of a polymeric binder, mixing of component materials, grinding of pigments in the polymeric binder, and thinning to commercial standards to provide a fluid coating.

Water dispersed coatings compositions containing epoxy resin are frequently used for coating cans and containers including plastic bottles. A typical plastic bottle is manufactured from polyethylene terepethalate (PET) thermoplastic molding resins. Although PET bottles and similar plastics are quite commonly used, thermoplastics provide a serious disposal problem since plastics do not disintegrate in landfills. Consequently PET and similar plastic containers are recycled either through a shredding process and subsequently reused as a low level plastic or subjected to a caustic cleaning where plastic containers are cleaned and reused. In either process, the originally applied coating must be removed, preferably with caustic treatment. Typical prior art coatings used for plastic bottles and containers often comprise polyamine crosslinked polyepoxide thermosetting resins, which frequently are permanently adhered to the plastic and cannot be removed by a caustic cleaning processes.

It now has been found that strippable acrylic water borne ionomeric latex coatings are particularly useful for coating PET and other plastic bottles, as well as plastic substrates generally, especially when the plastic is recycled. The cured ionomeric coatings are unexpectedly flexible, tough, very high in gloss, smooth, moisture resistant, heat pasteurization resistant, and resistant to boiling water. The ionomeric coatings are compatible with processes used to coat and recycle PET and similar plastics. The ionomeric coatings of this invention can be tinted to provide color to the plastic bottle, but leave the PET uncolored, and thus provide a greater value for recycling. The ionomeric coatings can provide a suitable barrier to oxygen ingress and carbon dioxide loss if a high ratio of pigments is added to enhance barrier properties. Caustic used to clean PET bottles prior to recycling will easily remove these strippable coatings. After recycling, new ionomeric coatings can be applied to plastic bottles to give a new fresh surface. The strippable ionomeric coating protects the PET from scratches and abrasion and thus prolonging the useful life of the PET bottle.

The aqueous strippable ionomeric coatings of this invention are based on a zinc or zirconium ammonium complexed ionomeric polymeric latex binder comprising a carboxylic acid functional polymer neutralized with ammonium and blended with a zinc or zirconium ammonium complex. An ionomer can be defined as a polymer composed of a polymeric backbone containing pendant carboxylic acid groups, which are ionically bound partially or completely with zinc or zirconium metal cations to form an ionomer. Aqueous coatings based on blends of amine neutralized carboxyl polymer and metal ammonia complex were found to be particularly stable in an aqueous mixture provided both components in the blend are fully neutralized. The neutralized blend of carboxyl polymer and zinc ammonia carbonate for instance do not interact until after the water and ammonia volatilize in the heat curing cycle, where the carboxyl functional polymer forms ionic crosslinks with the remaining zinc or zirconium cations. The ionomeric polymer was found to provide interreacting polymer chains which exhibit thermosetting properties comparable to coreactive polymeric binders crosslined by a crosslinker. These ionic moities and their interactions dominate the behavior of the polymer itself where it is believed that the cation is exchanged for a hydrogen ion of the polymer carboxyl group. Ionic hydrocarbon polymers for elastomers or plastics are disclosed in U.S. Pat. No. 3,264,272. Non-aqueous liquid and powder coatings useful as thermoset coatings generally are shown in commonly assigned U.S. Pat. No. 5,025,063, U.S. Pat. No. 5,306,134, U.S. Pat. No. 5,155,162, U.S. Pat. No. 5,157,073, U.S. Pat. No. 5,034,452, and U.S. Pat. No. 5,762,427.

In accordance with this invention, improvements in the properties of polymeric binders for paint coatings can be achieved through the interaction of the metal cation ammonia complex of zinc or zirconium reacted with ammonia neutralized carboxyl functional, aqueous emulsion polymers. The modification of polymer properties is believed due to aggregation of ions described as ionic crosslinking, where the coreaction of two ion pairs on adjacent polymer chains results in a four-centered aggregate and behaves essentially like a crosslink. The formation of ionomeric clusters or multiplets in protective surface coatings causes the carboxylic acid functional polymers to behave like a phase-separated block copolymers.

Paint coating compositions based on the ionomeric polymers provide an increase in the moduli, an increase in glass transition temperatures, and an increase in hardness. The actual cluster or multiplet formation takes place during the bake cycle at temperatures above the temperature where the zinc or zirconium ammonium complex salt will lose its acidified counterion. Thus, the addition of low levels of metal ammonia complex to carboxyl acid functional emulsion polymeric binders has been found to considerably improve on the physical properties of the carboxyl polymer. Incorporation of zinc ammonia carbonate, for instance, causes a thermoplastic acrylic ionomer to exhibit cured film properties such as solvent resistance and hardness comparable to a conventionally cured crosslinked paint film. Useful carboxyl polymers characteristically exhibit low polarity, high hydrophobicity, and low hydrogen bonding characteristics. Zinc and zirconium ammonium carbonate complexes are preferred and generally resist water or humidity and produce water resistant coatings. The acrylic ionomeric coatings are aqueous based, removable with caustic, contain zero VOC, and provide negligible toxicity other than ammonia. These and other advantages of the invention will become more apparent by referring the detailed description of the invention and illustrative examples.

SUMMARY OF THE INVENTION

Briefly, the invention pertains to an aqueous ionomeric strippable coating applied to plastics and adapted to be particularly removable from the plastic subtrates in caustic recycle recovery processes for recycling the plastic. The aqueous ionomeric coating is based on an ionomeric addition copolymer binder comprising aqueous addition copolymerized ethylenic unsaturated monomers, including carboxyl monomers, to produce a carboxyl functional addition emulsion (latex) copolymer, neutralized with ammonia or tertiary amine to completely neutralize the carboxyl functionality on the polymer. The neutralized carboxyl latex polymer is then blended with zinc or zirconium ammonium inorganic salt complex to form an aqueous dispersed ionomeric copolymer binder comprising by weight between 80% and 99.8% carboxyl polymer with the balance being zinc or zirconium ammonium complex as measured by zinc or zirconium metal solids. Dyes, color pigments, and/or barrier pigments can be added to the complexed ionomer along with other coating additives to form the aqueous ionomeric coating. The ionomeric coating can be applied to new or recycled plastic bottles by dipping, spraying or other coating application means. The applied coating films can be heat cured to volatilize the water and ammonia to cure the coating film.

DETAILED DESCRIPTION OF THE INVENTION

The aqueous ionomeric coatings of this invention are based on a carboxyl functional addition emulsion copolymer blended with zinc or zirconium ammonium complexes.

Referring first to the carboxyl functional addition copolymer, the preferred copolymer comprises aqueous emulsion addition copolymerization of ethylenic monomers in the presence of surfactants and initiators to produce emulsion polymerized polymers known as latexes. Ethylenically unsaturated monomers contain carbon to carbon double bond unsaturation and generally include vinyl monomers, styrenic monomers, acrylic monomer, allylic monomers, acrylamide monomers, as well as carboxyl functional monomers. Vinyl monomers include vinyl esters such as vinyl acetate, vinyl propionate, vinyl versatate, and similar vinyl alkyl esters, vinyl halides, vinyl aromatic hydrocarbons such as styrene and substituted styrenes, vinyl aliphatic monomers such as alpa olefins and conjugated dienes, and vinyl alkyl ethers such as methyl vinyl ether and similar vinyl lower alkyl ethers. Acrylic monomers include lower alkyl esters of acrylic or methacrylic acid having an alkyl ester chain from one to twelve carbon atoms as well as aromatic derivatives of acrylic and methacrylic acid. Useful acrylic monomers include for instance ethyl, butyl, and propyl acrylates and methacrylates, 2-ethyl hexyl acrylate and methacrylate, cyclohexyl, decyl, and dodecyl acrylates and methacrylics, and similar various acrylates and methacrylates. Hydrophobic lower alkyl monomers such as propyl, butyl, and 2-ethyl hexyl esters of acrylic or methacrylic acid are particularly preferred and should comprise by weight at least 10% preferably between 50% and 90% by weight of the ethylenic monomers copolymerized. Hydrophobic acrylate and methacrylate esters, such as butyl acrylate and butyl methacrylate, are most preferred.

In accordance with this invention, the carboxyl functional latex polymer contains copolymerized carboxyl functional monomers such as acrylic and methacrylic acids, fumaric or maleic or similar unsaturated dicarboxylic acid, where the preferred carboxyl monomers are acrylic and methacrylic acid. The carboxyl functional latex polymers comprise by weight between about 5% and 80% copolymerized carboxyl monomers with the balance being other copolymerized ethylenic monomers. The latex polymers have a number average molecular weight between about 5,000 and 10,000,000 as measured by gel permeation chromotagraphy (GPC). The Tg or softening point of the latex polymer can be between −20 and 150 degrees centigrade as calculated by the Fox equation or measured by ASTM 3418-75. The carboxyl functional latex should have an acid no. above 25 and preferably above 30.

To produce the carboxyl functional latex polymers, the ethylenically unsaturated monomers are copolymerized in an aqueous polymerzation medium by adding the ethylenic monomers to water along with surfactants and polymerizing initiators as well as other emulsion polymerization ingredients. Initiators can include for example typical free radical and redox types such as hydrogen peroxide, t-butyl hydroperoxide, di-t-butyl peroxide, benzoyl peroxide, benzoylpeoxide, 2.4 dichlorbenzoyl peroxide, t-butylperacetate, azobisisobutyronitrile, ammonium persulfate, sodium persulfate, potassium persulfate, sodium and potassium perbosphates, and redox initiators such as persulfate sodium formaldehyde sufoxylate, cumene hydroperoxide sodium metabisulfite, potassium persulfate sodium bisulfite, cumene hydroperoxide iron (II) sulfate and the like. Polymerization initiators are usually added in amounts between about 0.1 and 2 percent by weight of the monomers polymerized. Suitable anionic surfactants include for example salts of fatty acids such as sodium and potassium salts of stearic, palmitic, oleic, lauric, and tall oil fatty acids, salts of sulfated fatty alcohols, salts of phosphoric acid esters of polyethylated long chain alcohols and phenols, as well as sulfosuccinates such as dihexyl, dioctyl, ditridecyl and dodecylbenzene sulfonate. Non-ionic surfactants are also preferred and include polyoxyethlene glycols reacted to a lyophilic compound to produce a hydrophile lyophile balance (HLB) greater than two and preferably between 10 and 15, such as commercially known surfactants such as Triton surfactants, Igepal CA surfactants, and Tweens.

In accordance with this invention, the carboxyl monomer is copolymerized with other suitable monomers, including the acrylate and methacrylate esters, the styrenics, and the common vinyl monomers. Viscosity in the final product can be controlled by adding small quantities of a suitable chain transfer agent, such as n-dodecyl mercaptan. Levels up to about 5% chain transfer agent can be used with 0.1 to 1% being preferred. Common free radical initiators can be used, such as the peroxides, peresters, persulfates, and the like. Redox initiators allow the use of lower reaction temperatures. Ammonium persulfate is preferred. Suitable surfactants include the sulfate, sulfonate, and sulfosuccinate anionic surfactants, with dioctyl sulfosuccinate being preferred. Cosurfactants such as the medium alkyl alcohols can be added to enhance colloidal stability. The carboxyl functional emulsion copolymer is completely neutralized with excess equivalents of ammonia or ammonium hydroxide prior to complexing with the zinc or zirconium ammonium complexes in accordance with this invention. Alternatively, the carboxyl functionality can be neutralized with lower alkyl tertiary amines such as triethyl amine and dimethylethanol amine, although ammonium is preferred for neutralizing the carboxyl polymer. The completely neutralized carboxyl polymer becomes a water soluble dispersion of a solubulized latex comprising an ionized carboxyl polymer and ammonium cation complex.

Referring next to the cation metal ammonium salt for complexing with the neutralized carboxyl functional emulsion copolymer, zinc and zirconium have been found to be particularly effective. Zinc or zirconium are combined with ammonium to form a zinc or zirconium ammonium complex salt, preferably a carbonate. The complex ammonia salts are highly desirable since upon heat curing of the ionomer coating the ammonia readily volatilizes to cause formation of a clustered crosslinked coating.

The zinc or zirconium ammonia complex salt can be prepared by first hydrolyzing a zinc or zirconium salt in acid water and then adding ammonia to provide a final pH above about 9, preferably above 9.5, and in the presence of excess equivalents of ammonia to form a full metal ammonia complex. Zinc carbonate can be heated in acidic water to dissolve the zinc, and then excess equivalents of ammonia can be added to form the ammonia complex, which has a pH above 9.5. Zinc ammonium complex salts are preferred while zinc ammonia carbonate is most preferred. Commercial zinc ammonium carbonates are available such as Zincplex 15 sold by Ultra Additives Corporation. The zinc or zirconium ammonium complex salt is preformed and is stable indefinitely. Once formed, the metal ammonia complexes can be described as complex ammonia salts where the ammonia ions form well defined tetrahedral structures around zinc or zirconium metal cations. The ammonia complex are thought to shield the zinc or zirconium ion from interactions with the carboxyl polymer which blended together form an aqueous coating mixture. The metal ammonia complex remains stable when blended with the ammonia neutralized carboxyl polymer, where the blend remains stable until the applied paint film is heat cured to volatilize the water and ammonia.

In accordance with this invention, the ammonia neutralized emulsion copolymer and the metal ammonia complex salt can be performed and then mixed together to form a stable aqueous mixture. The coating mixture can be applied to a substrate and then coreacted to form an aqueous zinc or zirconium ammonium ionomer. Alternatively, the unneutralized carboxyl functional emulsion polymer can be mixed with zinc or zirconium salt along with excess equivalents of ammonia. This will assure full neutralization of the carboxyl polymer as well as full complexing of the zinc or zirconium salt to a respective ammonium complex salt. In either process, it is important that excess equivalents of ammonia are present in the aqueous mixture to avoid a premature reaction with either the carboxyl polymer or the metal salt due to deficient ammonia. Excess equivalents avoid the extraction of ammonia or amine from the polymer or extraction of ammonia from the metal ammoniun salt complex, which could destabilize the coating. Non-ionic surfactant may be used in preparing the acrylic latex, or may be added during neutralization. Although not necessary, non-ionic surfactants, such as the polyethyleneoxide nonyl phenols and alcohols, enhance the colloidal stability of the ionomeric coating.

In accordance with this invention, the useful level for zinc or zirconium complex combined with carboxylic acid functional copolymer, based on the equivalent of zinc or zirconium added per equivalent of available carboxylic acid functionality in the copolymer, is at least 5% of available carboxyl equivalents, and preferably between 15% and 150%, and most preferably between 25% and 75% of the available carboxyl groups. On a weight basis, for instance, between about 0.2% and 20% by weight zinc ammonia complex measured by zinc metal can be added to carboxyl polymer. Suitable processing temperatures for curing the ionomer must be sufficient to promote ionomeric interactions or clustering of the carboxylic acid polymer but less than the distortion temperature of the plastic substrate.

The aqueous coatings of this invention are stable in water as long as the carboxyl functionality on the acrylic addition polymer and the zinc or zirconium ammonia complex in the blend are fully neutralized. In the aqueous blend, neither the carboxyl polymer or the metal complex exhibit any ionic interaction. When the aqueous coating is applied to a substrate and heat cured, ionic bonds form between the zinc or zirconium cation and the carboxyl functionality on the acrylic polymer. Zinc for instance is a +2 ionic metal where one zinc cation clusters with two carboxyl groups. Not all carboxyl groups interact but typically around 50% form ionic bonds with the zinc. When 50% of the carboxyl groups are clustered with zinc metal, the ratio of zinc to carboxyl groups is 1:2 equivalent ratio or a 1:4 mole ratio. Preferably between 25% and 100% of the carboxyl groups are linked with zinc or zirconium cation. On a weight basis, the aqueous coating composition is based on a polymeric binder comprising between 80% and 99.8% carboxyl polymer with the balance being zinc or zirconium ammonia complex, as measured by zinc or zirconium metal in the blend.

Dyes, pigments, and barrier pigments may then be added to form an ionomeric coating. The coatings can be applied to finished PET or similar plastic bottles by dip, spray, or other means. Ambient or preferably warm air (less than 100° C.) is suitable for curing the films. The ionomeric binder is useful in aqueous coatings to provide thermoset-like properties to a heat cured film applied to plastic substrates. By properly balancing the hydrophobicity and polarity of the ionomeric polymers of this invention, thermoset crosslinked type properties or ionomeric linking can be achieved upon heating to induce the desired ionomeric clustering in accordance with this invention. The resulting paint film integrity properties resemble crosslinked polymer networks and exhibit high film hardness as well as considerable resistance to solvent and water. Cured paint films produced in accordance with this invention provide ionomeric interactions or clustering between ionomer polymer chains in a crosslink type fashion to produced cured paint films exhibiting considerable resistance to MEK and water along with improved hardness, and other film integrity properties. Coatings are applied to plastic substrates at thicknesses between about 0.1 and 1.0 mils dry.

In the recycling of plastic bottles or scrap plastics, the old plastics are treated with heated caustic water at temperatures typically below 150° F. It has been found that under caustic treatment, the clustered ionomeric coatings of this invention break down the crosslinks and thereby essentially disintegrates the coating enabling easy separation from the recycled substrate. Caustic cleaned bottles can then be reused by applying a new ionomeric coating of this invention to the recycled cleaned plastic bottle.

The merits of this invention are further demonstrated in the following illustrative examples.

EXAMPLE 1

| | | Preparation of an Acrylic carboxyl latex |
|---|---|---|
| a) | 2124 | water |
| | 12 | OT-75 (75% dioctylsulfosuccinate in water) |
| b) | 6.0 | n-dodecyl mercaptan |
| | 660 | butyl methacrylate |
| | 300 | butyl acrylate |
| | 240 | methacrylic acid |
| c) | 6.0 | ammonium persulfate |
| | 60 | water |
| d) | 3.0 | n-hexanol |
| e) | 0.9 | t-butylhydroperoxide, 70% |
| f) | 0.5 | sodium formaldehyde sulfoxilate |
| | 5.0 | water |

Heat a) to 75° C. under a nitrogen blanket. Add 60 g of (b), then add (c). Hold 30 minutes. Feed in 570 g of (b) over 90 minutes. Add (d) to the remaining 570 g of (b) and then feed this in over 90 minutes. Add (e) and hold 30 minutes. Then add (f), and hold 30 minutes, and then repeat (e) and (f) additions. The resulting latex copolymer is then cooled to room temperature.

EXAMPLE 2
Preparation of an Acrylic carboxyl latex.

Prepare a katex copolymer as in Example 1, but use 756 g butyl methacrylate and 144 g methacrylic acid in the formation of the copolymer.

EXAMPLE 3
Preparation of an Ionomer

Mix together 439 g NH3 (28%), 366 g Zinplex 15 (completely netralize zinc ammonia carbonate), 110 g Triton x 405 surfactant and 7771 g water. Add 7,314 g latex solution from Example 1. Ionomer is viscous, smooth and translucent and provides an excellent coating.

EXAMPLE 4
Preparation of an Ionomer

Mix together 366.5 g NH3 (28%), 611 Zinplex 15, and 153 g Triton x 405. Add 10,180 g latex solution from Example 2. The resulting ionomer provides an excellent coating.

Results: When coating from Examples 3 and 4 were applied to PET beverage bottles the ionomers form films with very high gloss and smoothness, no cracks or defects, good tape adhesion, and good scratch resistance. Films did not blush when pasteurized. The cured coating was removed from the PET substrate by heated caustic to enable the PET bottle to be recoated and used again.

The foregoing description and examples illustrate the merits of this invention but are not intended to be limiting except by the appended claims.

What is claimed is:

1. An aqueous dispersed protective coating composition containing an ionomeric binder, the iononmeric binder composition comprising by weight:

(a) between 80% and 99.8% of an amine neutralized, carboxyl functional addition copolymer of emulsion copolymerized ethylenic unsaturated monomers in water of at least 5% carboxyl monomers, at least 10% hydrophobic monomers, with the balance being other ethylenic monomers, to produce a carboxyl functional emulsion copolymer having a number average molecular weight between about 5,000 and 10,000,000 and an Acid No. above about 25, where the carboxyl functional emulsion copolymer is neutralized with ammonia or a tertiary amine to produce a completely neutralized emulsion copolymer;

(b) between 0.2% and 20% of an aqueous dispersed ammonium complex salt of zinc or zirconium as measured by zinc or zirconium metal;

And where components (a) and (b) form a stabilized aqueous mixture but interreact upon heat reacting an applied film of the coating composition to form a ionomeric clustering complex.

2. The aqueous coating composition in claim 1 where the carboxyl functional addition emulsion copolymer comprises between 5% and 80% copolymerized carboxyl monomer.

3. The aqueous coating composition of claim 1 where the carboxyl functional addition emulsion copolymer comprises between 50% and 90% of copolymerized hydrophobic monomer.

4. The aqueous coating composition of claim 1 where the carboxyl functional emulsion copolymer is neutralized with an ammonia.

5. The aqueous coating composition of claim 1 where the carboxyl functional emulsion copolymer is neutralized with an amine.

6. The aqueous coating composition of claim 1 wherein the ammonia complex salt is a zinc ammonia complex.

7. The aqueous coating composition of claim 6 where the ammonia complex is zinc ammonia carbonate.

8. The aqueous coating composition of claim 1 wherein the ammonia complex salt is a zirconium complex.

9. The aqueous coating composition of claim 8 where the ammonia complex is zirconium ammonia carbonate.

* * * * *